United States Patent [19]

Thoma

[11] Patent Number: 5,538,056
[45] Date of Patent: Jul. 23, 1996

[54] LOG CONDITIONING BEFORE MECHANICAL DEBARKING

[75] Inventor: Eduard J. Thoma, W. Vancouver, Canada

[73] Assignee: Beloit Technologies, Inc., Wilmington, Del.

[21] Appl. No.: 357,477

[22] Filed: Dec. 16, 1994

[51] Int. Cl.$^6$ .............................. B27L 1/00; B23K 26/00
[52] U.S. Cl. .................................. 144/342; 83/15; 83/16;
83/879; 83/881; 144/340; 144/364; 144/367;
144/380; 144/357; 144/2.1; 144/208.1;
144/208.6; 219/121.6
[58] Field of Search ........................................ 83/13, 14, 15,
83/16, 861, 875, 879, 881; 144/2 R, 208 R,
208 G, 340, 341, 342, 356, 357, 364, 367,
380; 430/945; 219/121.11, 121.18, 121.6

[56] References Cited

U.S. PATENT DOCUMENTS

| | | |
|---|---|---|
| 2,439,508 | 4/1948 | Edwards et al. . |
| 2,809,683 | 10/1957 | Hoiss . |
| 2,881,814 | 4/1959 | Avard ........................................ 144/342 |
| 3,236,273 | 3/1963 | Rich et al. . |
| 3,392,764 | 10/1965 | Yeadon . |
| 3,435,861 | 4/1969 | Shields . |
| 3,501,077 | 2/1968 | Wigner et al. . |
| 3,807,470 | 4/1974 | Young . |
| 3,991,800 | 11/1976 | Palmquist . |
| 4,369,823 | 1/1983 | Gustafsson . |
| 4,432,403 | 2/1984 | Heikkinen ............................... 144/342 |
| 4,784,196 | 11/1988 | Pousette . |
| 4,805,678 | 2/1989 | Kutilin . |
| 5,044,412 | 9/1991 | Price et al. . |
| 5,103,883 | 4/1992 | Viikari et al. . |

OTHER PUBLICATIONS

"Industrial Lasers and Their Applications", John E. Harry McGraw Hill, pp. 119–124.
"Lasers: Operation, Equipment, Application and Design" Engineering Staff of Coherent, Inc., McGraw–Hill Book Co. pp. 95–97.
"Rubber Tyre Supported Barking Drums", Rauma Repola Brochure.
"The New Woodyard for United Paper Mills Kaipola" Rauma–Repola Brochure.

*Primary Examiner*—W. Donald Bray
*Attorney, Agent, or Firm*—Dirk J. Veneman; Raymond W. Campbell

[57] ABSTRACT

High powered lasers are used to score the bark on logs before they are mechanically debarked. Typical of the lasers employed are multi-kilowatt $CO_2$ industrial lasers. A high powered laser beam is brought to a focus just above the surface of the bark on the log. A jet of compressed air is blown coaxially with the beam and facilitates the beam's formation of a narrow slot in the surface of the bark. Logs are advanced and rotated by a plurality of parallel augers extending across the base of a trough. The lasers are positioned in a gap beneath and in between sets of augers. The beam's focus may be adjustable with respect to the bark's surface. The motion of the log with respect to a laser head produces a spiral cut along the surface of the log which slices the long fibers in the bark,

12 Claims, 2 Drawing Sheets

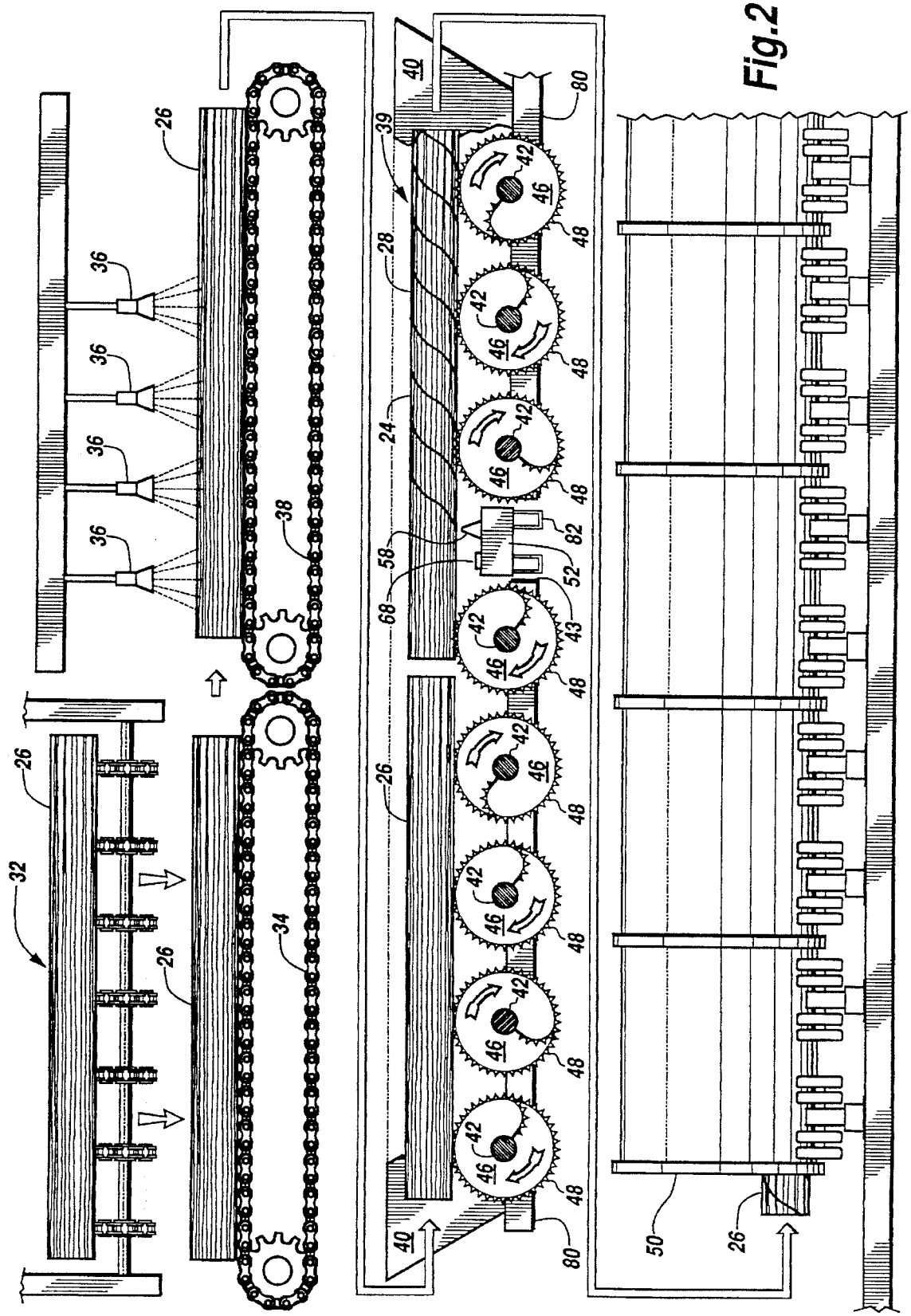

LOG CONDITIONING BEFORE MECHANICAL DEBARKING

FIELD OF THE INVENTION

The present invention relates to an apparatus and method for conditioning the bark of logs to facilitate debarking.

BACKGROUND OF THE INVENTION

Certain wood species have barks which contain long, relatively strong fibers. For example, in the case of Eucalyptus globulus, the bark of the relatively newly felled trees adheres so loosely to the core of the tree that any debarking tools or cutting knives fail to cut the bark. Instead, bark is pushed in front of the tool, so that the bark leaves the log in the form of long strips which soon block the log handling mechanisms. Drum debarkers employ a large rotating drum with internal surface elements which cut and chip the bark off logs tumbled within the drum. The drum has openings which allow the bark to fall through while the logs are progressed towards the chipper. However, in many cases, particularly with bark containing long fibers, the bark will form balls two or three feet in diameter which are too large to pass through the openings in the drum and which are thus advanced to the chipper. It is undesirable to have bark enter the chipper, because bark-contaminated wood chips will include dark fibers which resist bleaching and which thus lower the grade of paper made from the chips.

Debarking of logs can be particularly difficult in the winter in northern climes because the bark is frozen to the log. Soaking the logs in hot water is of limited effectiveness in thawing the bark. The bark itself resists water, and thus prevents hot water from penetrating into the bark. The bark is somewhat insulative and so, in practice, very little thawing takes place through the bark thickness.

Handling bark removed from certain species is also difficult. The large bark sheets from eucalyptus can plug conveyors and holding bins. Bark sheets may intertwine and adhere to each other, causing blockages, for example creating an entire bin of bark agglomerated into a single mass. To alleviate these blockages, separate bark handling process lines are often used, including a chopping apparatus for reducing the size of the bark pieces. Such apparatuses are expensive and are subject to clogging and mechanical failure during operation.

In the past, complicated pre-treating devices and methods have been used with some log species in an attempt to facilitate bark removal and handling. However, most such devices have generally been prohibitively expensive and operationally ineffective. In some locales bark is still stripped by hand from eucalyptus with resultant high labor costs.

What is needed is a process for conditioning the bark on a log to facilitate its mechanical removal from the log.

SUMMARY OF THE INVENTION

This invention employs high powered lasers to score the bark on logs before they are mechanically debarked. Typical of the lasers employed are multi kilowatt $CO_2$ industrial lasers. A high powered laser beam is transmitted through an optical train to a laser head which brings the laser beam to a focus just above the surface of the bark on the log. A jet of compressed air, typically at pressures of 30 to 45 psi, is blown coaxially with the beam and facilitates the beam's vaporization and burning away of a narrow slot in the surface of the bark. The logs are advanced and rotated by a plurality of parallel augers extending across the base of a trough. The lasers are positioned in a gap between and beneath the augers such that the logs pass over and adjacent to the lasers. The laser head focuses the laser beam onto the bark, and may have an adjustable focus for focusing the beam with respect the bark's surface. The motion of the log with respect to a laser head produces a spiral cut along the surface of the log which slices the long fibers which tend to run horizontally along the log. If the direction of the log rotation is reversed, a second laser can cut an overlapping spiral which reduces the bark to regular sections.

Processing the logs typically involves advancing the logs on a chain conveyor, washing them and dumping them into the log handling section which rotates and progresses the logs over a multiplicity of laser beams focused on the surface of the logs. The laser beams cut narrow channels in the bark on the log's surface.

It is a feature of the present invention to facilitate the debarking of logs.

It is another feature of the present invention to cut long fibers within the bark of certain tree species to facilitate mechanical debarking of said logs.

It is a further feature of the present invention to facilitate the penetration of hot water or other fluids into the surface of the bark on the log to be debarked.

It is a still further feature of the present invention to provide an apparatus and method for scoring the bark on logs without mechanically loading the bark thus causing it to prematurely peel off.

Further objects, features and advantages of the invention will be apparent from the following detailed description when taken in conjunction with the accompanying drawings.

BRIEF DESCRIPTION OF THE DRAWINGS

FIG. 2 is a schematic view of logs being conveyed, washed, laser scored and mechanically debarked in the process of this invention.

DESCRIPTION OF THE PREFERRED EMBODIMENT

Figure 1:
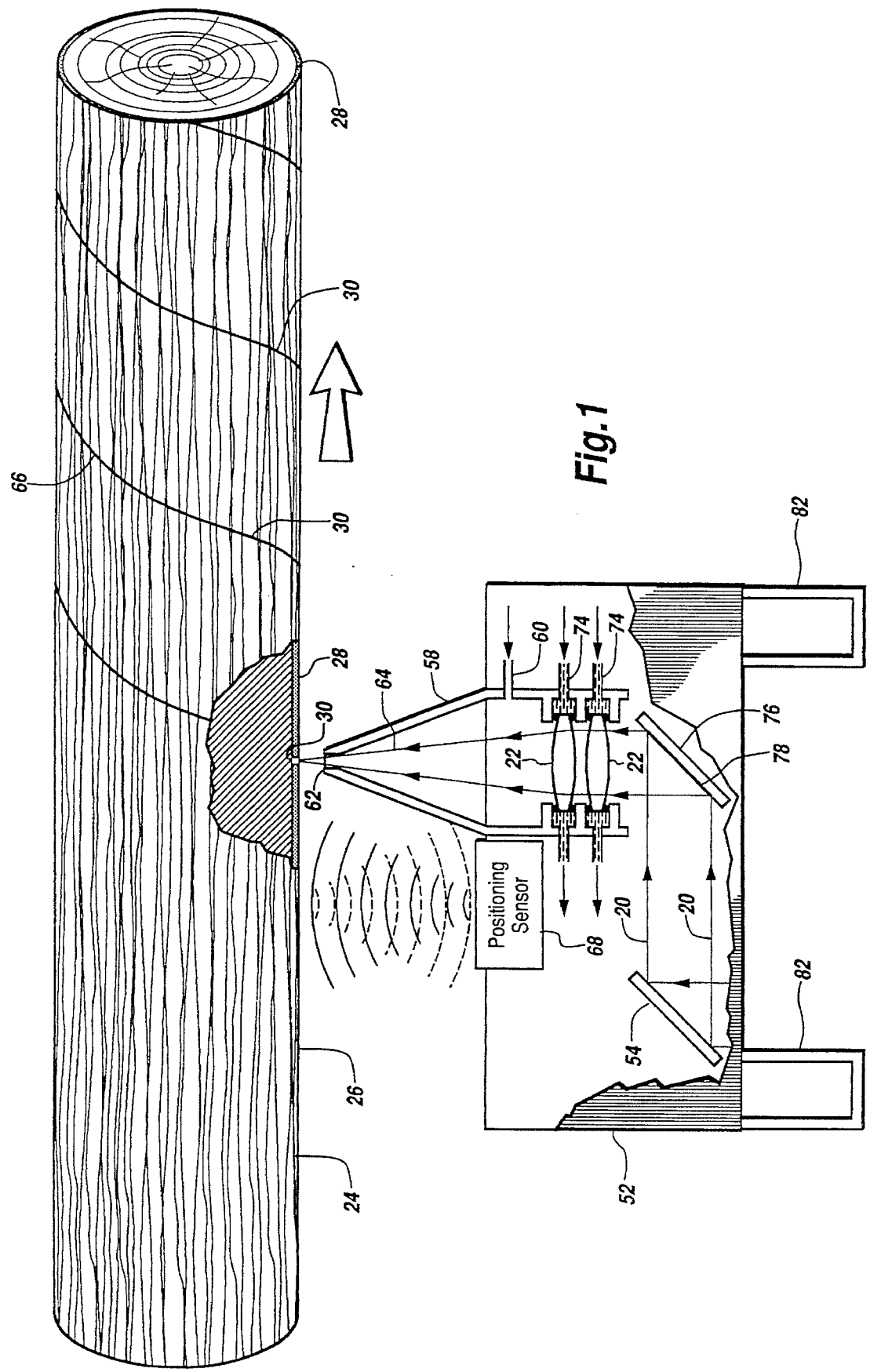
FIG. 1 is an enlarged, schematic, partly cut-away view of the laser cutting head employed in the log conditioning method of this invention.

Referring more particularly to FIGS. 1–2, wherein like numbers refer to similar parts, a laser beam 20 is shown in FIG. 1. The laser beam 20 is focused by two lenses 22 onto the surface 24 of a log 26. The log surface 24 is covered by a layer of bark 28. Where the laser beam 20 meets the log surface 24, a narrow groove 30 is formed in the bark 28. The groove 30 scores the bark 28.

As shown in FIG. 2, logs 26 are unloaded from a log infeed 32 onto a transport chain 34. The transport chain 34 advances the logs 26 to pass under a washer 36. From the washer 36 a second chain drive 38 transports the logs 26 to a trough 40 which forms part of a laser bark conditioning station 39. The trough has a plurality of augers 42 which line the bottom 44 of the trough 40. The helical blades 46 which form the augers 42 have spiked projections 48. The logs 26 are engaged by the spikes 48 such that rotation of the augers 42 in the same direction rotates the logs 26 about their long axes and translates or moves forward the logs toward the drum debarker 50.

In order to facilitate the debarking of the logs in the drum debarker 50, the bark 28 of the logs 26 is scored by a plurality of laser beams 20. As the logs are rotated by the augers 42, they are also translated longitudinally, and are made to pass over a plurality of laser heads 52. Each laser beam 20 is supplied by a conventional industrial laser (not shown) typically of the high powered $CO_2$ industrial type laser. Other lasers of sufficient power, including possibly neodymium: yttrium - aluminum-garnet (Nd:YAG), could be used. The laser beam 20 is brought to a laser head 52 by an optical train 54 which transmits the beam 20 into the laser head 52.

As shown in FIGS. 1 and 2, the laser heads 52 are maintained beneath, adjacent to, and slightly spaced from the surfaces 24 of the logs 26. A laser beam is directed through a nozzle 58 which is supplied with air or oxygen through an inlet 60. The air exits the nozzle tip 62 and forms a jet of air which is coaxial with the focused laser beam 64. For maximum depth of cut with minimum beam energy, the laser beam is focused just above or at the surface 24 defined by the bark 28.

The air jet is not essential to cutting but, as generally known in the industry, facilitates the operation of the laser beam which operates through a rapid burning or vaporization of the material exposed to the beam. A typical pressure for the supply gas, as known to those skilled in the art, is thirty to forty-five psi with greater pressures generally not having greater effectiveness. As the log 26 is caused to rotate and translate by the augers 42 in the trough 40, the laser beams 20 score a narrow groove 30 in a sinuous path 66 along the log. Because the log bark fibers, which cause difficulties in debarking, generally run along the length of the log 26, a helical or circumferential groove pattern 66 is effective at shortening these fibers. Although the groove 66 has been shown as a continuous spiral, it may be discontinuous or broken, depending on the smoothness of the conveyance of the logs between adjacent laser heads.

If desired, a second intersecting sinuous path may be cut on the logs by a second laser conditioning station (not shown) similar to the laser conditioning station 39 but in which the augers cause the logs to roll in the opposite direction. Although in practice the laser may not score the bark continuously, with substantial circumferential scoring the bark will be more readily removed in the debarker and the tendency of the bark to ball up will be substantiality reduced. Similarly, where the scoring is used to facilitate the removal of frozen bark complete scoring is not necessary to get the benefits of improved penetration of de-icing fluids such as hot water.

As shown in FIG. 1, an exemplary laser head 52 which may be employed in the laser conditioning station 39 is maintained at a fixed position below the log 26 as the log is transported by the augers 42 across the gap 43 where the lasers are positioned. The laser head has an ultrasonic sensor 68 which constantly senses the distance between the head 52 and the surface 24 just in front of where the groove 30 is being formed. The sensor improves the laser's cutting action by adjusting the focus of the laser beam 20. The ultrasonic sensor 68, as will be understood by those skilled in the art, may be used in conjunction with a motor (not shown) which adjusts the spacing between the lenses 22 to maintain the laser focused on the surface 24 of the log 26 as the log is transported by the augers 42 over the laser head 52.

Optical components transmit the laser beam 20 to the laser head 52 and on to the logs 26. As is known to those skilled in the optical arts, there is a relationship between the focusing lenses 22, the diameter of the beam 20, and the depth of field of the focused beam 64. As shown in FIG. 1, as the laser beam leaves the lenses 22, the beam 20 converges. The convergence is illustrated as a point in FIG. 1 but in real applications has a finite size.

For optimal effectiveness in cutting, it is desirable that the spot size be small so that the power density is high. This is facilitated by the short focal length lens on the order of, for example, one to five inches. On the other hand, a short focal length rapidly converges the beam 20, with the result that while having a high power density at the focus, the beam has a relatively narrow depth-of-field over which a high power density is maintained. Depth of field is associated with the necessity of keeping the beam head 52 at a relatively fixed distance from the log surface 24. To the extent to which it is difficult to keep the laser head 52 at a precise distance from the log 26, a more gradually converging beam will be optimal. The focusing lenses 22 provide a compromise between short focal length and greater depth of field, thus optimizing the cutting power of the laser where the distance between the log and the laser head cannot be precisely controlled.

A more gradually converging beam which has a greater depth of focus has a lower maximum energy density and thus requires more beam power for a given rate of travel and depth of cut along the bark surface 24. It is to be understood that there is a relationship between the focal length of the lens, total beam power, the depth of cut desired and the rate of beam movement over the log surface. From known examples cutting plywood, it might be expected that a ten kilowatt $CO_2$ laser which outputs a laser beam with a wave length of 10.6 micrometers and operates at a five inch focal length might be expected to cut a three-quarter inch groove at approximately one-half foot per second. On the other hand, a ten kilowatt $CO_2$ laser cutting a one-quarter inch groove and being focused through a 1.5 inch focal length lens might be expected to cut at a rate of eleven feet per second.

The head 52 is illustrated with adjustable focusing lenses 22. The focusing lens must typically be cooled by a water supply system 74 to remove that small part of the beam energy which is absorbed by the lenses as the beam transits the lenses. In some cases, particularly with high beam powers, it may prove more practical to use a lensless design wherein a transmitting mirror 76 has an optical surface 78 which can bring the beam to a focus without the aid of a lens. Two or more mirrors can be used to form an adjustable focus optical system using only mirrors.

Because the handling of logs which are heavy and massive generates considerable vibration, it will be desirable to have the log trough mounted on a frame 80 which is vibrationally isolated from the frame 82 on which the laser heads 52 are mounted.

It should be understood that although the laser beams are shown as brought to a focus closely adjacent to the logs, and the laser heads positioned closely beneath the logs, if laser beams of sufficiently high power are utilized, a simple steered mirror which would traverse the laser beam over the log surface at a substantial distance away from the logs could be used.

Mechanisms other than the spiked augers shown could be utilized to rotate and translate the logs and so present the log surface for scoring by the laser beams. In a mechanical debarker where each log is gripped and debarked the laser head could be positioned to take advantage of the movement caused by the mechanical debarker to move the logs past the laser beam for scoring the bark.

It should also be understood that the laser beam focus with respect to a log may be adjusted by other means than the ultrasonic transducer illustrated in FIG. 1. For example, a wheel which rides on the log or an optical or microwave sensor. A sensor on the laser head should be capable of detecting whether a log is positioned above the head so the laser beam can be turned off or diverted to another laser head when no log is above a given laser head.

As will be understood by those skilled in the art of laser workstation design, the laser conditioning station 39 will for safety reasons be enclosed to prevent injury to personnel.

The depth of the groove formed by the laser beam in the bark surface can be varied by varying the beam power, by varying the beam focal length, the beam rate of travel over the log surface, or the relationship between the surface and the position of the beam focus.

Because the bark thickness of logs of the same species of a similar age is relatively uniform, the depth of groove cut may be set to correspond with the bark thickness of the logs being processed. The scoring produced by the laser facilitates the debarking of logs by any known method including hydrojets, and mechanical debarkers. Mechanical debarkers employ a plurality of cutting tools which are positioned around the circumference of the log, the tools rotating on the log as the log travels therebetween, and the tools stripping the bark from the log.

In addition to scoring the bark to ease the bark removal, the score lines may also facilitate the thawing of the bark by allowing the penetration of hot water through the bark where logs with frozen bark are being processed. Ideally the bark would be sufficiently scored so that the bark portions defined by the score lines do not exceed six inches in any dimension. At the same time, it is understood that considerably less scoring is also advantageous in facilitating the processing of logs having fibrous bark or to facilitate thawing bark on frozen logs.

It is understood that the invention is not limited to the particular construction and arrangement of parts herein illustrated and described, but embraces such modified forms thereof as come within the scope of the following claims.

I claim:

1. An apparatus for scoring bark on logs to facilitate subsequent bark removal, the apparatus comprising:

a first frame;

a log conveyor mounted to the first frame for conveying a log to be debarked;

a second frame vibrationally isolated from the first frame;

a head mounted to the second frame;

a high powered industrial laser which produces a laser beam;

an optical train mounted to the head to receive said laser beam and direct said beam onto a log conveyed by the log conveyor, and wherein the directed laser beam scores the bark without significant bark removal on a log advanced by the log conveyor; and said optical train and said log conveyor operationally related to cause said laser beam to score a groove substantially encircling said log to shorten fibers in the bark layer.

2. The apparatus of claim 1 wherein the log conveyor comprises a plurality of generally parallel augers mounted to the first frame for rotation about axes transverse to the direction of conveyance.

3. The apparatus of claim 2 wherein each auger has a blade with teeth extending therefrom to grip and rotate logs.

4. The apparatus of claim 1 wherein the optical train is mounted below the log conveyor to prevent logs from hitting the optical train.

5. An apparatus for treating a log having a layer of bark with an outer surface, to prepare the log for subsequent debarking, the apparatus comprising:

a means for translating and rotating the log; and a means for projecting and focusing a laser beam on the outer surface of the log as it is translated and rotated to score the bark on the log to facilitate the subsequent debarking of the log.

6. The apparatus of claim 5 wherein the means for translating and rotating the log is comprised of a plurality of augers mounted for rotation about axes transverse to the direction of conveyance.

7. The apparatus of claim 6 wherein the augers have blades with teeth extending therefrom to grip and rotate logs.

8. The apparatus of claim 5 wherein the means for projecting and focusing is mounted below the means for translating and rotating to prevent logs from hitting the means for projecting and focusing.

9. A method of debarking a log comprising the steps of:

rotating and translating a log to be debarked, wherein the log has an outer surface covering of bark;

projecting a laser beam onto said outer surface of the log as it is rotating and translating, such that the laser beam traces a path along said outer surface;

scoring the covering of bark by vaporizing a narrow groove of bark with said laser beam; and thereafter removing the scored covering of bark.

10. The method of claim 9 wherein the step of rotating and translating the log comprises:

engaging a log by a plurality of augers; and rotating said engaged augers about axes substantially perpendicular to the axis of the log.

11. The method of claim 10 further comprising the steps of:

reversing the direction of rotation of the log while continuing the direction of translation of the log; and forming a second narrow groove in the covering of the bark by operation of a laser beam, wherein the second groove intersects the groove previously formed.

12. The method of claim 9 wherein the laser beam is projected from below an apparatus which preforms the rotating and translating of the logs to be debarked.

* * * * *